United States Patent
Shamas

(10) Patent No.: US 11,432,668 B1
(45) Date of Patent: Sep. 6, 2022

(54) SMART HANGER SYSTEM

(71) Applicant: Faiq Shamas, San Diego, CA (US)

(72) Inventor: Faiq Shamas, San Diego, CA (US)

( * ) Notice: Subject to any disclaimer, the term of this patent is extended or adjusted under 35 U.S.C. 154(b) by 664 days.

(21) Appl. No.: 16/381,335

(22) Filed: Apr. 11, 2019

(51) Int. Cl.
| | |
|---|---|
| *A47G 25/14* | (2006.01) |
| *G06Q 30/02* | (2012.01) |
| *A47G 25/06* | (2006.01) |
| *G06Q 30/06* | (2012.01) |

(52) U.S. Cl.
CPC ..... *A47G 25/1407* (2013.01); *A47G 25/0664* (2013.01); *G06Q 30/0281* (2013.01); *G06Q 30/0623* (2013.01); *A47G 2200/08* (2013.01); *A47G 2200/143* (2013.01)

(58) Field of Classification Search
CPC ............ A47G 25/1407; A47G 2200/08; A47G 25/0664; G06Q 30/0281; G06Q 30/0623
See application file for complete search history.

(56) References Cited

U.S. PATENT DOCUMENTS

| | | | |
|---|---|---|---|
| 5,809,470 A | 9/1998 | Monjo | |
| 7,228,995 B2 | 6/2007 | Carty | |
| 272,364 A1 | 10/2015 | Larsen | |
| 9,717,357 B2* | 8/2017 | Johnson | ............ A47G 25/1407 |
| 2004/0251871 A1* | 12/2004 | Dvorak | .................. H02J 7/025 |
| | | | 320/108 |
| 2015/0272364 A1* | 10/2015 | Larsen | ...................... G09F 9/35 |
| | | | 223/96 |
| 2018/0253785 A1* | 9/2018 | Chong | ............... G06Q 30/0643 |
| 2018/0289189 A1* | 10/2018 | Lazzi | ...................... H02J 7/025 |

FOREIGN PATENT DOCUMENTS

JP          10057700 A  *  3/1998  ............. A47G 25/14

* cited by examiner

*Primary Examiner* — Nathan E Durham
(74) *Attorney, Agent, or Firm* — Sanchelima & Associates, P.A.; Christian Sanchelima; Jesus Sanchelima

(57) ABSTRACT

An electronic hanger system for identifying clothing articles is disclosed. The electronic hanger system comprises a charging station comprising a plurality of arms, a hub provided at the charging station, and one or more electrical contact points provided at each of the arms. The electronic hanger system comprises a plurality of hangers placed at a closet rack. Each hanger comprises hanger arms used for hanging at least one clothing article, a metal suspension hook coupled to the closet rack, an audio output device provided at the hanger arms and an illuminating device provided at the hanger arms. The electronic hanger system comprises a user device configured to store information corresponding to the hubs and the clothing articles hanged to the hangers. A user of user device uses the user device to select the clothing article based on the style, type, and description of the clothing article. The user device transmits a request to the hub. The hub transmits the request to the hanger to produce sound by the audio output device or to illuminate the illuminating device such that the user's attention is drawn to the hanger holding the clothing article.

9 Claims, 6 Drawing Sheets

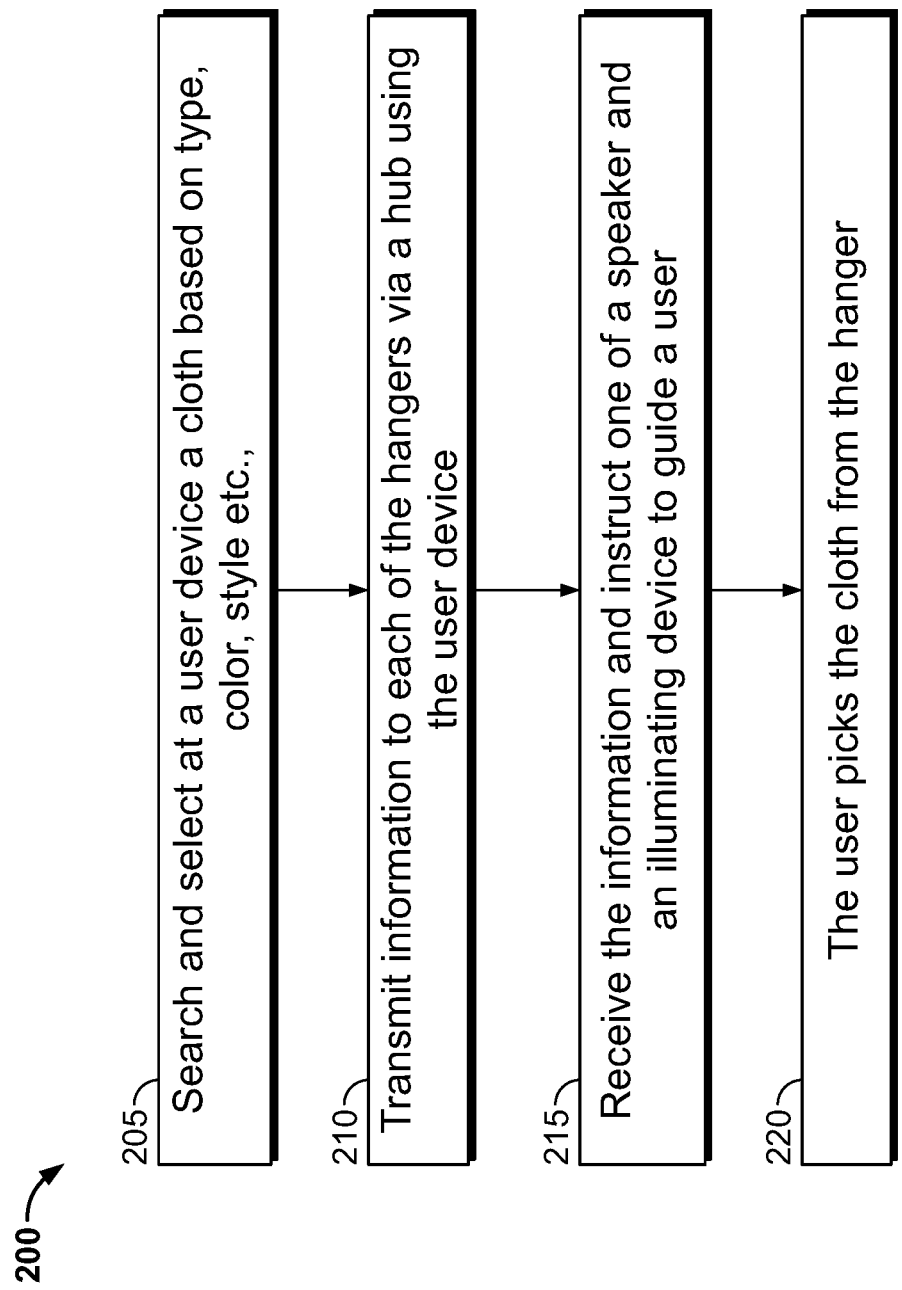

SMART HANGER SYSTEM

BACKGROUND OF THE INVENTION

1. Field of the Invention

The present disclosure generally relates to a field of clothes hangers. More specifically, the present disclosure relates to an electronic hanger system comprising a hanger configured to emit light and sound in order to identify the hanger and corresponding clothing articles hanged thereon.

2. Description of the Related Art

It is known that hangers are generally used to hang articles of clothing. Several structures or designs of the hangers are well known and are generally structured and arranged to hold an article of clothing thereon, such as a coat draped over the shoulder portions of the hanger. Other example of hanger designs have an additional means to hold a clothing item folded over the bottom rung or tube portion such as trousers, skirts, or the like.

Although the hangers are useful in hanging the clothing articles, they pose few problems when several clothing articles are hung over closet rack or wardrobe. For instance, a user may have to slide through several clothing articles to pick a clothing article of his choice. This may cause inconvenience if the clothing articles are not arranged properly. Further, while browsing through several clothing articles, the user may accidently cause wrinkles over the clothing articles. Furthermore, the user may take considerable time to identify the clothing article that he wishes to pick from the hub or wardrobe.

In order to overcome the problem of identifying the clothing articles in the closet or wardrobe, several solutions have been provided in the past. One such solution is disclosed in a U.S. Pat. No. 7,228,995. In U.S. Pat. No. 7,228,995B2, a clothes hanger apparatus and structure having text messaging appendages extending laterally outwardly from the upper neck portion of the hanger is disclosed. At least one additional horizontal bar from which additional articles of clothing can be attached or hanged, each such bar comprises a linear horizontal extending member equilaterally affixed below the neck portion of the hanger, the customary horizontal bar member being adapted with a receptacle such as a clear, netting, or transparent paper disposable bag for containing and exposing underwear, ties, scarves, socks, and the like. The text messaging appendages are adapted to indicate to the wearer or his or her valet, caregiver, a child, or a childcare provider the day of the week for which the garments attached to hanger are to be used along with related clothing and/or other instructions pertinent to the wearer.

Another example is disclosed in a U.S. Pat. No. 5,809,470. In U.S. Pat. No. 5,809,470A, it is disclosed that an electronic sound generating message emitting circuitry with message storing on a programmable computer chip mounted to a garment hanger. The sound emitting circuitry comprising an electronic circuit which includes a sound synthesizer, sound producing means and a power supply coupled together for emitting pre-stored messages from a programmed synthesizer chip. A radio signal receiver and transmitter coupled together for transmitting stored messages from the programmable computer chip to a main computer upon receiving an activation signal. Information such as delivery date, price, etc. can be transmitted making receiving of goods and inventory faster and less expensive. The message emitted can be used as a form of direct advertisement emitting sales messages upon pressing of a button or upon vibrations produced by movement of the hanger. The garment hanger can be reused since the computer chip is programmable and the synthesizer chip in the sound producing means is replaceable.

Another example is disclosed in a United States patent application 20150272364. In US20150272364A1, a clothes hanger for supporting an item of clothing is disclosed. The clothes hanger includes a hanging means for hanging the clothes hanger from a support means, and further includes an electronic display device located in the region of the neck portion 5 of the clothes hanger, the electronic display device including a viewing screen adapted to display promotional and/or informational material. The arrangement and construction is such that the electronic display device is adapted to be activated, or activatable, upon the clothes hanger being removed from the support means by a user.

Although the above disclosures are helpful in providing information about the clothing article, they have few problems. For instance, the user has to go close to the clothing article in order to obtain the information about the clothing article before identifying the clothing article. Further, the display of clothing information is limited to simple information such as the size of clothes.

Other documents describing the closest subject matter provide for a number of more or less complicated features that fail to solve the problem in an efficient and economical way. None of these patents suggest the novel features of the present invention. Specifically, none of the disclosures in the art disclose an electronic hanger system, which comprises a means to identify the clothing article easily.

Therefore, there is a need in the art for an electronic hanger system, which comprises a means to identify the clothing article easily.

SUMMARY OF THE INVENTION

It is one of the main objects of the present invention to provide an electronic hanger system for identifying clothing articles easily and avoids the drawbacks of the prior art.

It is one object of the present invention to provide an electronic hanger system comprising a hub, a plurality of hangers and a user device, in which the user device is used to identify the hangers via the hub.

It is one object of the present invention to provide an electronic hanger system for identifying clothing articles. The electronic hanger system comprises a charging station comprising a plurality of arms, a hub provided at the charging station, and one or more grooves with electrical contact points provided at each of the arms. The electronic hanger system comprises a plurality of hangers placed at a closet rack. Each hanger comprises hanger arms used for hanging at least one clothing article, a metal suspension hook connected to internal rechargeable battery and coupled to the closet rack, an audio output device provided at the hanger arms and an illuminating device provided at the hanger arms. The electronic hanger system comprises a user device configured to store information corresponding to the hubs and the clothing articles hanged to the hangers. A user uses the user device to select the clothing article based on the style, type, and description of the clothing article. The user device transmits a request to the hub. The hub transmits the request to the hanger to produce sound by the audio output device or to illuminate the illuminating device such that the user's attention is drawn to the hanger holding the clothing article.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 8 illustrates a method 200 of identifying clothing articles, in accordance with one embodiment of the present disclosure.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one of ordinary skill in the art will understand that variations can be substituted that are within the scope of the invention as described.

The present disclosure discloses an electronic hanger system for identifying clothing articles. The electronic hanger system comprises a charging station comprising a plurality of arms, a hub provided at the charging station, and one or more grooves with electrical contact points provided at each of the arms. The electronic hanger system comprises a plurality of hangers placed at a closet rack. Each hanger comprises hanger arms used for hanging at least one clothing article, a metal suspension hook connected to internal rechargeable battery and coupled to the closet rack, an audio output device provided at the hanger arms and an illuminating device provided at the hanger arms. The electronic hanger system comprises a user device configured to store information corresponding to the hubs and the clothing articles hanged to the hangers. A user uses the user device to select the clothing article based on the style, type, and description of the clothing article. The user device transmits a request to the hub. The hub transmits the request to the hanger to produce sound by the audio output device or to illuminate the illuminating device such that the user's attention is drawn to the hanger holding the clothing article.

Various features and embodiments of an electronic hanger system for identifying clothing articles explained in conjunction with the description of FIGS. 1-8.

Figure 1:
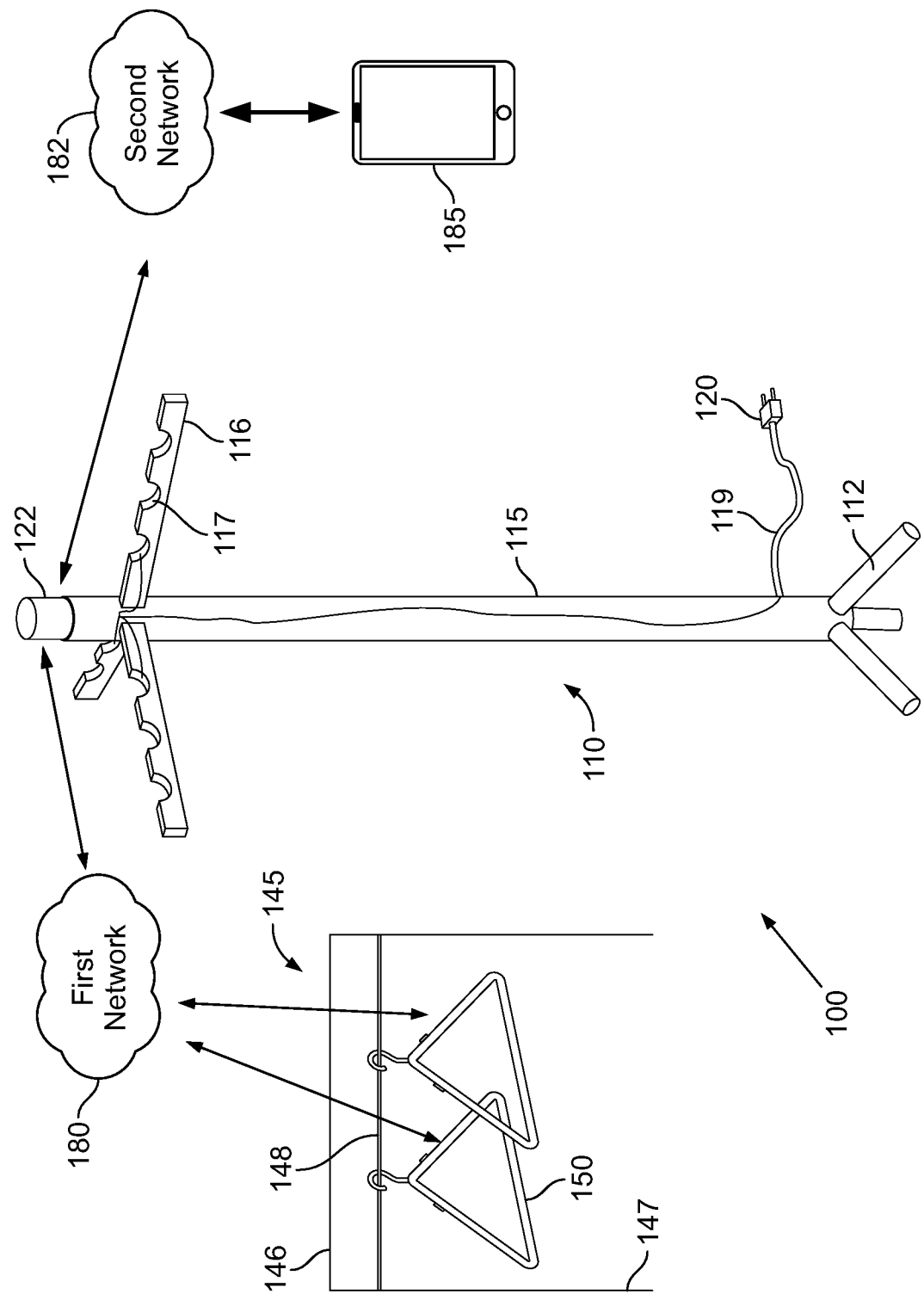
FIG. 1 illustrates an environment of an electronic hanger system 100 for identifying clothing articles, in accordance with one embodiment of the present disclosure.
Figure 2:
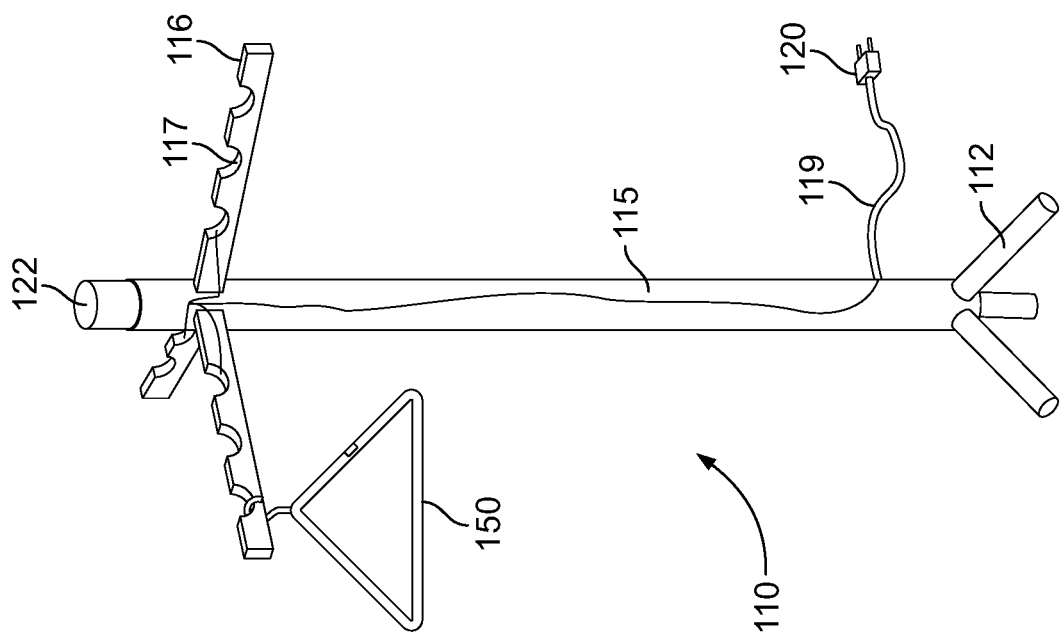
FIG. 2 illustrates a charging station 110, in accordance with one embodiment of the present disclosure.

Referring to FIG. 1, a schematic diagram of an electronic hanger system 100 is shown, in accordance with one embodiment of the present disclosure. The electronic hanger system 100 comprises a charging station 110. Referring to FIG. 2, the charging station 110 is explained. The charging station 110 comprises a base 112. The base 112 may be made up of metal, wood, hard plastic or any other suitable materials. Although the base 112 is shown to have legs, it should be obvious to a person skilled in the art to provide the base 112 in other shapes such as a flat base or resting on plurality of legs in different shapes and sizes.

Further, the charging station 110 comprises an elongated rod 115 coupled to the base 112. The elongated rod 115 may be made up of metal, wood, plastic or any other suitable materials. It should be understood that the elongated rod 115 might have a mechanism to extend and contract so as to adjust the length/height of the elongated rod 115. Further, the charging station 110 may comprise a plurality of arms 116 extending from the elongated rod 115. Each of the arms 116 may be made up of metal, wood, plastic or any other suitable materials. The arms 116 might be coupled to the elongated rod 115 using known mechanisms such as welding or using fasteners. It should be understood that the arms 116 might be provided at suitable height. In one example, the arms 116 may be coupled at a height of four to six feet from the ground. However, the arms 116 may be placed at desired height depending on the need.

Each of the arms 116 is provided with one or more grooves with electrical contact points 117. As can be seen, one or more electrical contact points 117 might be provided by cutting portions of each the arms 116. It should be understood that one or more electrical contact points 117 might be provided with metal pads made up of conductive material that can be used for charging a battery provided in a hanger.

Further, the charging station 110 may comprise a cable 119 at the bottom of the elongated rod 115. The cable 119 may comprise a plug point 120 at one end of the cable 119. It should be understood that the plug point 120 might be coupled to a power source (not shown) to draw power and charge the battery of the hanger through one or more electrical contact points 117. As can be seen, the cable 119 is electrically coupled to the one or more electrical contact points 117 provided within grooves at the arms 116. In one example, the cable 119 may further comprise a rectifier (not shown) capable of converting Alternating current (AC) to Direct Current (DC). Alternatively, the elongated rod 115 might be provided with a battery (not shown) as an alternative to power source to power the one or more electrical contact points 117.

Figure 3:
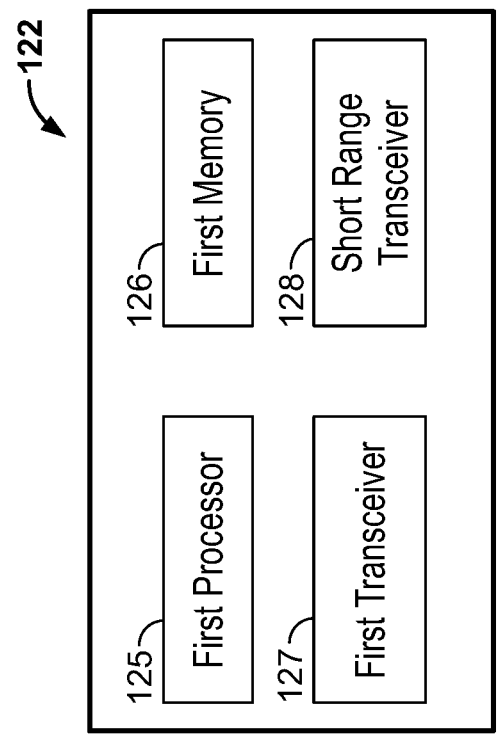
FIG. 3 illustrates a block diagram of a hub 122, in accordance with one embodiment of the present disclosure.

Further, the charging station 110 comprises a hub 122 provided on top of the elongated rod 115. It should be understood that the hub 122 might indicate a box or container made up of hard plastic, metal or any other suitable material. The hub 122 may be provided in square, rectangular, cylindrical or any other shape. Now referring to FIGS. 1, 2 and 3, the hub 122 is explained. As can be seen in FIG. 3, the hub 122 may comprise a first processor 125, a first memory 126, a first transceiver 127, and a short-range transceiver 128.

The first processor 125 may be implemented as one or more microprocessors, microcomputers, controllers, digital signal processors, central processing units, state machines, logic circuitries, and/or any devices that manipulate signals based on operational instructions. Among other capabilities, the first processor 125 is configured to fetch and execute computer-readable instructions or program instructions stored in the first memory 126.

The first memory 126 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, and so on.

The first transceiver 127 is used to transmit and receive signal/data from the hub 122 to external devices. The first transceiver 127 may transmit the data over a long-range wired or wireless communication protocol including, but not limited to a cellular network, satellite or any other protocol.

The short-range transceiver 128 may be used to transmit and receive signal from the hub 122 using a short range communication (wired or wireless) protocol which includes, but not limited to, a Bluetooth Low Energy, Bluetooth, WIFI, Li-Fi, infrared and so on.

Now referring to FIGS. 1, and 2, the electronic hanger system 100 comprising a hanger assembly 145 is shown. The hanger assembly 145 may include a clothing rack 146 supported on upstanding poles 147. The clothing rack 146 further comprises a tube 148 extending across the length of the clothing rack 146 and coupled to the upstanding poles 147. It should be understood that tube 148 is coupled to the upstanding poles 147 using known mechanism such as welding or fasteners.

Figure 4:
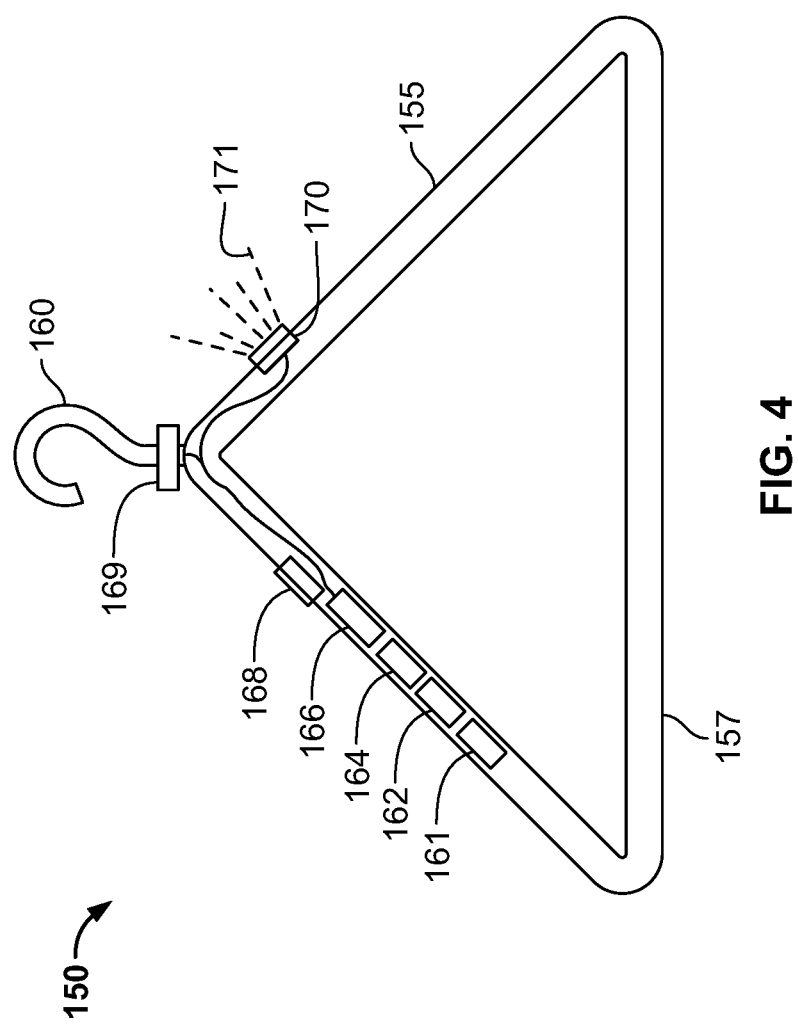
FIG. 4 illustrates a hanger 150, in accordance with one embodiment of the present disclosure.

The hanger assembly 145 may further comprise a plurality of a plurality of hangers 150, in accordance with one embodiment of the present disclosure. Referring to FIGS. 1 and 4, the hangers 150 are explained. Each of the hangers 150 may be made up of metal, wood, plastic or any other suitable materials. Each of the hangers 150 may comprise two hanger arms 155 extending from a central neck portion (not shown). In one example, the hanger arms 155 may be formed as a single structure. Further, the hanger 150 comprises a cross member or tube or bottom rung 157 coupled to the hanger arms 155. The cross member 157 may be used to hang a clothing article such as a trouser, skirt and so on. It should be understood that hanger arms 155 and neck portion, in combination, are adapted to support an item of clothing article 175, as shown in at least FIG. 7. Further, the hanger 150 comprises a metal suspension hook 160 provided at the neck portion. The metal suspension hook 160 may be removably coupled to the hanger arms 155 using known mechanisms. In one implementation, the hanger arms 155 and neck portion may be integrally formed from a plastic material. The metal suspension hook 160 may be made up of metal and, during manufacture, is subsequently connected to the neck portion. The metal suspension hook 160 is used to couple the hanger arms 155 to the tube 147 of the clothing rack 146. It should be understood that the metal suspension hook 160 maybe made of metal and during manufacture, is subsequently connected to battery 166 of the hanger 150.

Further, each of the hangers 150 may comprise a second processor 161, a second memory 162, a second transceiver 164, a battery 166, a speaker or audio output device 168, a weight sensor 169 and an illuminating device 170, as shown in FIG. 4.

The second processor 161 may be implemented as one or more microprocessors, microcomputers, controllers, digital signal processors, central processing units, state machines, logic circuitries, and/or any devices that manipulate signals based on operational instructions. Among other capabilities, the second processor 161 is configured to fetch and execute computer-readable instructions or program instructions stored in the second memory 162.

The second memory 162 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, and so on.

The second transceiver 164 is used to transmit and receive signal/data from the hanger 150 to external devices such as the hub 122. It should be understood that the second transceiver 164 may be used to transmit and receive signal from the hanger 150 to the hub 122 using a short range communication (wired or wireless) protocol which includes, but not limited to, a Bluetooth Low Energy, Bluetooth, WIFI, Li-Fi, infrared and so on. However, it is obvious to a person skilled in the art to configure the second transceiver 164 to transmit and receive signals over a long-range communication protocols that are known in the art.

The battery 166 may include a rechargeable battery that is known in the art. The battery 166 is used to operate the second processor 161, the second memory 162, and the second transceiver 164. Further, the battery 166 may be used to draw power from the charging points 117 to charge the hanger 150 when placed over the electrical contact points 117 provided at the arm 116 of the charging station 110.

The audio output device 168 may indicate a speaker or buzzer capable of producing sound.

The weight sensor 169 may be used to measure weight of the hanger 150. As such, the second processor 161 determines when the clothing article 175 is hung over the hanger 150 with the help of the weight sensor 169. In other words, the weight sensor 169 is used to measure weight of the hanger 150, with which the clothing article 175 being hung to the hanger 150 can be determined.

The illuminating device 170 may indicate a light emitter, which may include Light Emitting Diode (LED) lights capable of producing light.

It should be understood that each of the hangers 150 is communicatively coupled to the hub 122 via a first network 180. The first network 180 may indicate a network in which two devices are communicatively coupled using short-range communication (wired or wireless) protocols. The first network 180 may utilize Bluetooth Low Energy, Bluetooth, WI-FI, Li-Fi, infrared etc. to facilitate communication between the hub 122 and the hanger 150.

Now, referring to FIG. 1, the electronic hanger system 100 comprises a user device 185, in accordance with one embodiment of the present disclosure. The user device 185 may indicate an electronic device which may include, but not limited to, a mobile phone, a tablet, a smart watch, a potable digital assistance device, a computer and so on. As can be seen from FIG. 1, the user device 185 may be communicatively coupled to the hub 122 via a second network 182. The second network 182 may be a wireless network, a wired network or a combination thereof. It should be understood that the second network 182 might indicate a long-range network communication protocol, which includes satellite communication, cellular network and so on. The second network 182 can be implemented as one of the different types of networks, such as intranet, local area network (LAN), wide area network (WAN), the internet, and the like.

Figure 5:
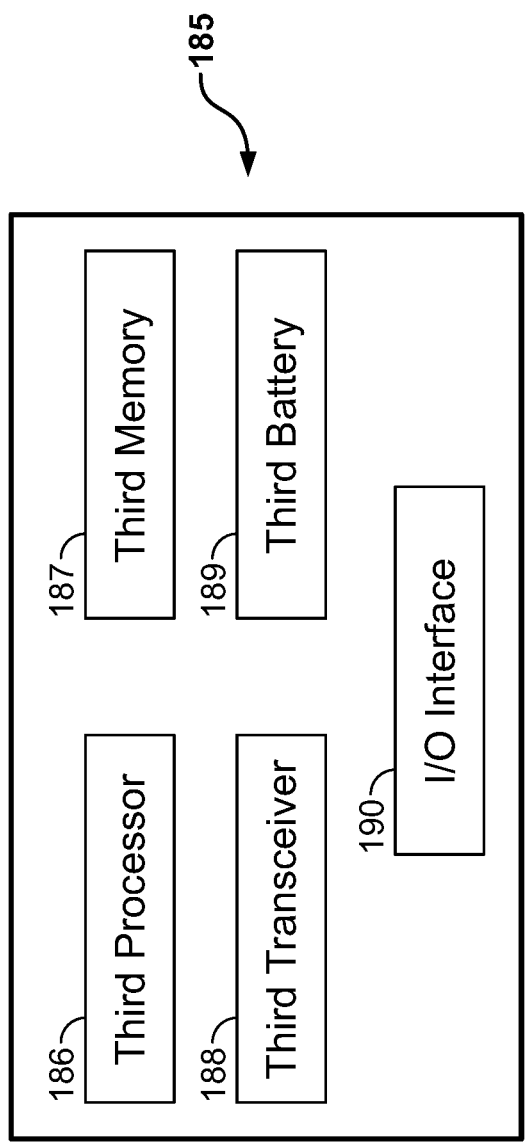
FIG. 5 illustrates a block diagram of a user device 185, in accordance with one embodiment of the present disclosure.

Now referring to FIG. 5, the user device 185 is explained. As specified above, the user device 185 may indicate an electronic device which may include, but not limited to, a mobile phone, a tablet, a smart watch, a potable digital assistance device, a computer and so on. The user device 185 may comprise a third processor 186, a third memory 187, a third transceiver 188, a third battery 189, and an I/O interface 190.

The third processor 186 may be implemented as one or more microprocessors, microcomputers, controllers, digital signal processors, central processing units, state machines, logic circuitries, and/or any devices that manipulate signals based on operational instructions. Among other capabilities, the third processor 186 is configured to fetch and execute computer-readable instructions or program instructions stored in the third memory 187.

The third memory 187 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, and so on.

The third transceiver 188 is used to transmit and receive signal/data from the hub 110 and external devices. It should be understood that the third transceiver 188 is capable of communicating with other devices such as the hub 122 using the long-range network communication protocol, which includes satellite communication, cellular network and so on.

The third battery 189 may include a rechargeable battery that is known in the art. The third battery 189 is used to operate the third processor 186, the third memory 187, and the third transceiver 188.

The I/O interface 190 may include a variety of software and hardware interfaces, for example, a web interface, a graphical user interface, a touch interface, and the like. The I/O interface 190 may allow the user device 185 to interact with the user directly or through other devices (not shown).

Figure 6:
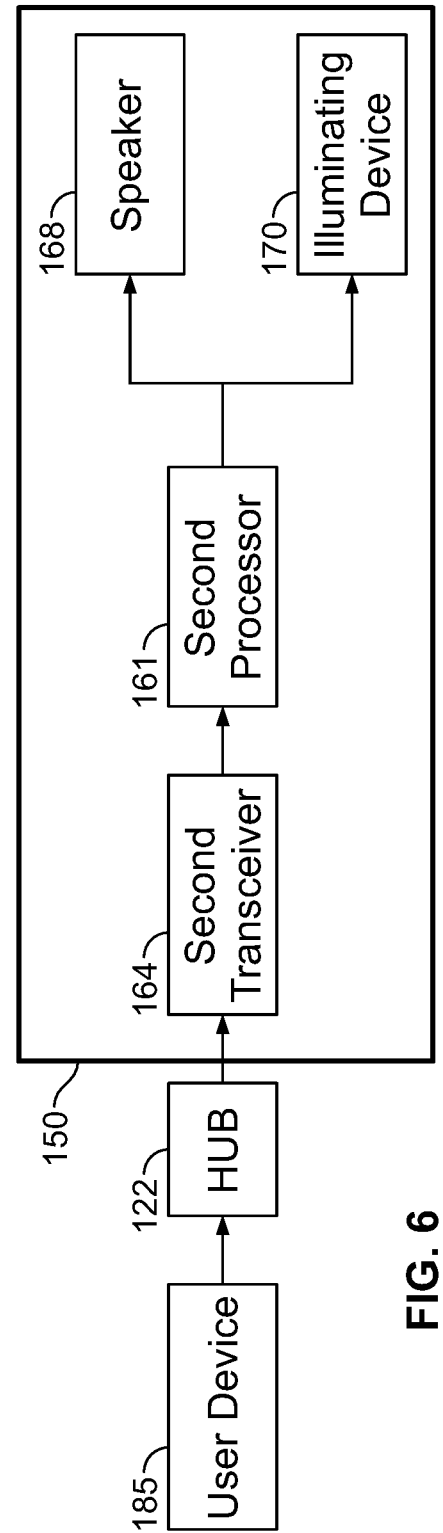
FIG. 6 illustrates operational flow of the electronic hanger system 100 for identifying clothing articles, in accordance with one embodiment of the present disclosure.
Figure 7:
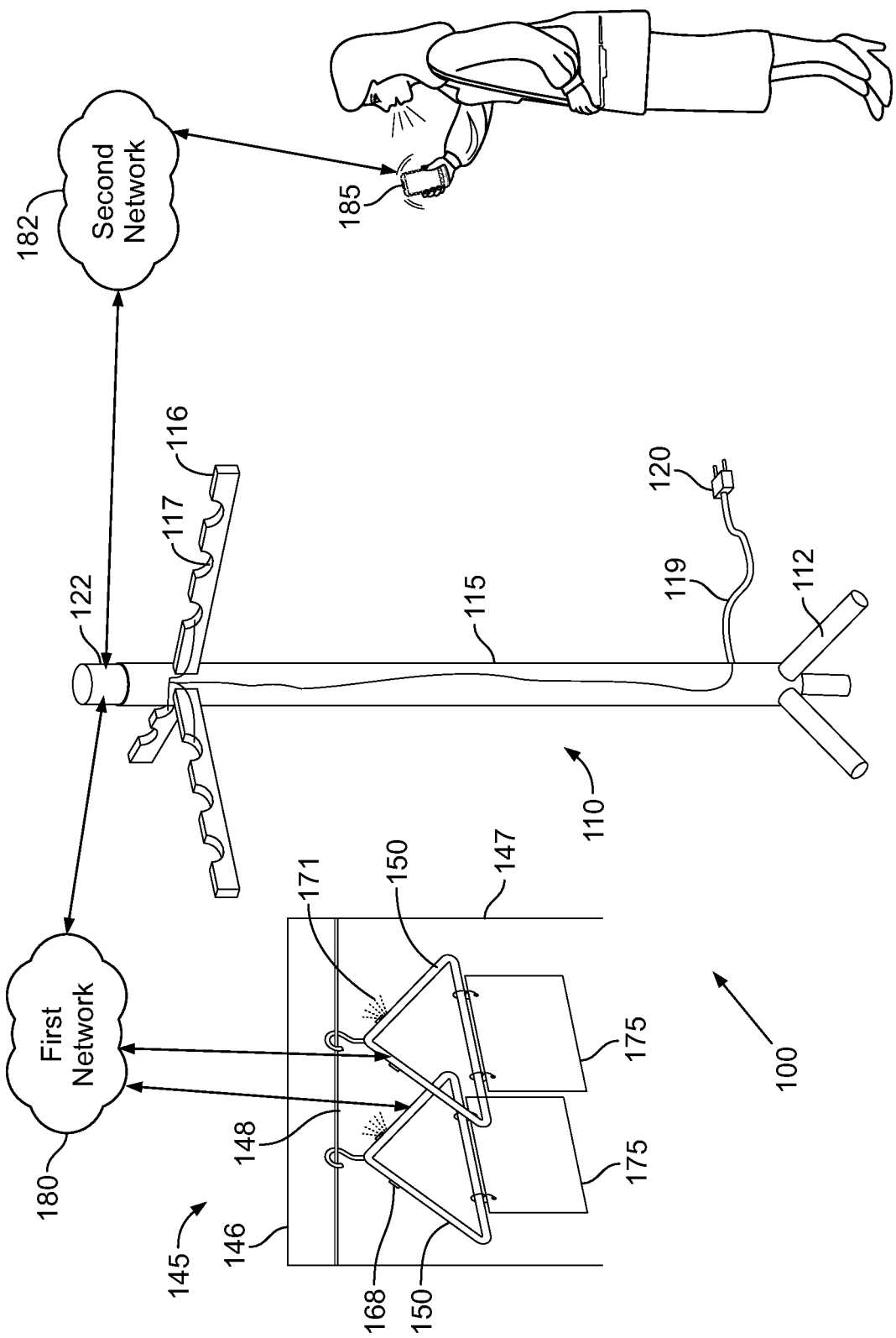
FIG. 7 illustrates operation of the electronic hanger system 100 for identifying clothing articles, in accordance with one embodiment of the present disclosure.

Now referring to FIGS. 6 and 7, operation of the electronic hanger system 100 is explained, in accordance with one exemplary embodiment of the present disclosure.

At first, each of the hangers 150 may be provided with a unique identification number i.e., a serial number. Subsequently, each of the hangers 150 may be registered with the hub 122. Subsequently, the hub 122 may transmit the details of the hangers 150 registered with the hub 122. As specified above, the hangers 150 communicate with the hub 122 using the first network 180 i.e., using a short-range communication protocol. Further, the hub 122 communicates with the user device 185 using the second network 182 i.e., using a long-range communication protocol.

After receiving the unique identification numbers associated with the hangers 150 registered with the hub 122, a user of the user device 185 may employ the I/O interface 190 to enter description, color, style etc. of the clothing article 175 that may be hung to the hangers 150. Specifically, the user device may associate entered description, color, style etc. of the clothing article 175 with corresponding unique identification numbers of registered hanger 150. After registering the hangers 150 with the user device 185 via the hub 122, the user of the electronic hanger system 100 may hang the clothing articles 175 to the hangers 150 and place them over the tube 148 of the clothing rack 146. It should be understood that the clothing articles 175 are hung corresponding to the color and style as might be registered with the user device 185.

It should be understood that the details corresponding to the clothing articles 175 hanged to the hangers 150 may be stored in the third memory 187 of the user device 185. Further, the details may be shared with a server (now shown). Similarly, the details corresponding to the clothing articles 175 coupled to the hubs 122 are also stored in the third memory 187 of the user device 185. As such, the user device 185 may comprise details of total number of hubs 122 and the clothing articles 175 hanged to each of the clothing rack 146.

When a user of the user device 185 wishes to pick or select a particular clothing article 175 from the clothing rack or closet 146, then the user may search for the clothing article by navigating the options provided at the I/O interface 190. For example, the user may search for the clothing article e.g., white shirt by typing the description. Subsequently, the user device 185 may display the hanger 150 in which the clothing article 175 is hung. Subsequently, the user may select hanger 150 displayed as result of search in I/O interface 190.

Subsequently, the user device 185 may transmit the selection or request to the hub 122, which is in proximity to the clothing rack 146 that is having the hanger 150 holding the clothing article 175. As specified above, the user device 185 transmits the selection to the hub 122 using the long-range communication protocol. After receiving the selection, the hub 122 may transmit the selection to the hanger 150 using the short-range communication protocol. It should be understood that the request corresponding to the clothing article selected is transmitted based on the unique identification number associated with the clothing article 175.

After receiving the request, the second processor 161 of the hanger 150 may instruct the audio output device 168 such that the audio output device 168 may produce sound to draw attention of the user to the hanger 150 based on the selection. In one example, the second processor 161 may instruct the illuminating device 170 such that the illuminating device 170 may produce or flash light 171 continuously or intermittently to draw attention of the user to the hanger 150 based on the selection, as shown in FIG. 7. In other words, when the user device 185 finds a match based on the description of the search, upon user selection the user device 185 will send notification to the hub 122 to activate the hanger 150 based on the serial number associated with matched description, and the hub 122 will command the hanger 150 to light up or sound a buzz.

Subsequently, the user may walk up to the hanger 150 to take the clothing articles 175 that he selected on the user device 185. The user may repeat the procedure to select one or more clothing articles 175. Further, it is obvious to a person skilled in that art that the user device 185 may also be used to communicate with one or more hubs 122 in case the user has more than one clothing racks 146 used for hanging clothing articles 175. As such, each hub 122 may be used to pick clothing articles of user's choice. Once the user has made their selection and picked out the clothing items they desire, they can silence the notifications coming from audio output device 168 and from illuminating device 170. They can achieve this through I/O interface 190 found on user device 185.

After picking the clothing article 175 from the hanger 150, the user may place the empty hanger on charging station 110. Specifically, the user may place the hanger 150 over the arm 116 of the charging station 110 i.e., at one of the electrical contact points 117 as shown in FIG. 2. When the empty hanger at the electrical contact points 117, the metal suspension hook 160 may come in contact with the electrical contact points 117. As specified above, the electrical contact points 117 is coupled electrically coupled to the power source. As a consequence, the battery 166 of the hanger 150 might get charged. Although it is explained that the battery 166 of the hanger 150 might get charged with the help of the metal suspension hook 160 having the electrical contact points 117, it should be understood that the battery 166 might also get charged wirelessly using the technologies known in the art. If the battery 166 is configured to charge wirelessly, then the metal suspension hook 160 might be made up of any material such as plastic, or any other suitable material.

It should be understood that the hub 122 obtains the serial number of the hanger 150 and corresponding power levels from the battery 166 of the hanger 150. In one example, the hangers 150 might also be configured to transmit signal to the hub 122 in order to notify the user device 185 when the battery 166 of the hanger 150 is low. In such a scenario, the hanger 150 may illuminate/buzz intermittently to draw user attention and the hub 122 may notify the user via I/O interface 190 of user device 185 to connect the hanger 150 to the charging station 110 in order to recharge the battery 166 of the hanger 150.

Further, the hanger 150 may be configured to determine that the hanger 150 is not holding any clothing article 175 with the help of the weight sensor 169. Subsequently, the hanger 150 may update the user device 185 via the hub 122 that the hanger 150 is free to hang to clothing articles 175. Accordingly, the user may use the information and place the clothing articles after the battery 166 of the hanger 150 is recharged.

It should be understood that the above explanation, in which the user may use the user device 185 to select the clothing article 175, is provided as an exemplary implementation and should not be construed in limited sense. In one alternate implementation, the hub 122 may be communicatively coupled to external devices (not shown) capable of processing voice signals and communicating with the user device 185 and the hub 122 in order to select the clothing article 175. Examples of the external devices capable of recognizing and processing voice signals may include but not limited to devices Apple Home™ by Apple Inc and Alexa™ by Amazon. In the current example, consider that hub 122 is communicatively coupled to the external device e.g., Amazon's Alexa. The user may issue voice commands e.g., "Alexa, show me black dresses". Upon receiving the voice command, the external device i.e., the voice recognition device may transmit the command to the hub 122. Subsequently, the hub 122 may identify the hangers 150 that are holding 'black dresses'. After identifying, the hub 122 may instruct the hangers 150 holding the black dresses to activate the audio output device 168 to produce sound or instruct the illuminating device 170 to produce light 171 continuously or intermittently or both, to draw attention of the user to the hanger 150.

Referring now to FIG. 8, a method 200 for selecting a clothing article is shown, in accordance with an embodiment of the present disclosure. The method 200 may be described in the general context of computer executable instructions or a sequence of steps to be performed for automated checkout. However, the order in which the method 200 is described and is not intended to be construed as a limitation, and any number of the described method blocks can be combined in any order to implement the method 200 or alternate methods. Additionally, individual blocks may be deleted from the method 200 without departing from scope of the disclosure described herein. For ease of explanation, in the embodiments described below, the method 200 may be implemented in the above-described electronic hanger system 100.

At step 205, a user searches and selects the type, style, color of clothing article based on his choice. The user may search and select the clothing article using the user device 185.

After selecting the clothing article to be picked using the user device 185, the serial number or any identifier corresponding to the selection of the clothing article is transmitted to the hubs 122 using a long-range communication protocol, as shown at step 210.

At step 215, the hub 122 communicates the selection to the hanger 150 holding the clothing article. It should be understood that the hub 122 might communicate the selection using a short-range communication protocol to the hanger 150. Subsequently, the second processor 161 of the hanger 150 activates audio output device 168 and the illuminating device 170. Upon receiving the instruction, the audio output device 168 may produce sound or the illuminating device 170 may flash light 171 such that attention of the user is drawn to the hanger 150 holding the clothing article.

At step 220, the user may pick the clothing article from the hanger 150 that produced sound or emitted the light.

Based on the above, it is evident that the electronic hanger system may be used to identify the clothing articles easily. As such, the electronic hanger system may be implemented at homes or retail stores to hang clothing articles of various configuration based on color, style and so on.

Although it is shown that the hangers are hung on the charging station, it is obvious to a person skilled in the art to use a clothing rack or wardrobe or any other structure to place the hangers to hang the clothing articles and implement the present disclosure to identify the clothing articles.

Further, the present disclosure is explained considering that the hangers are provided with audio output device or the illuminating device. However, it is also possible to provide the audio output device or the illuminating device at the hub to identify the hub easily in case multiple hubs are used.

In one implementation, the electronic hanger system may be used to maintain clothes that have been used by the user on a specific day or week or month. In other words, the user device may be used to display clothes that were used by the user as the user device can store logs or history of the usage of the hangers and corresponding clothing articles used. Further, the user device maybe used to schedule clothing articles for future day(s). In such scenario, user will select the planned clothing articles on planned day and corresponding hanger will buzz/illuminate to draw user attention. Alternatively, the electronic hanger system may utilize Artificial Intelligence (AI) to obtain history of the clothing articles selected by the user on particular day, week or month in order to learn the behavior or pattern of the user's dressing selection. Based on the learning, the electronic hanger system may provide suggestions or recommendations of the clothing articles on a future day, week or month to the user.

In an alternate implementation, the embodiments of the present disclosure may also be implemented in a stand-alone clip that will have the processor and transmitter similar to the hanger. The clip may or may not be provided with the weight sensor. The clip can be used/clipped with existing hangers as an alternate solution instead of buying new hangers with integrated chips. In such implementation, the electronic hanger system may comprise a stand-alone box that contains the hub and a mechanism to recharge battery inside the clip. It should be understood that the clips might be used to identify shoes or similar items in a house or retail store.

In another alternate implementation, the embodiments of the present disclosure may be implemented in a closet system where the rod or tube holding the hangers will provide electrical contacts to charge the hangers. Alternatively, the battery of the hangers may be charged using wireless charging methods. As a result, the need for metal contacts between hanger and charging points is avoided.

In an alternate implementation, the hangers may be provided with beacons to identify the hangers such that the user may use the beacons or beacon signals to reach the hanger.

Furthermore, the hanger may be programmed to display and/or provide promotional and/or informational material instantaneously to the user via user device in relation to each clothing article they are interested in. For example, the hanger may be provided in the retail stores, which will be programmed with the information about the clothing article. The user or shopper may select the color, style, etc of the clothing article he is searching for using his user device and hanger/hubs will push promotional and/or informational material and directions to hanger location through beacons.

Further, it should be understood that the electronic hanger system might also be implemented in other industries where a plurality of articles of other types are placed. For example, the electronic hanger system may be used in a factory or grocery store to identify the products of the user's choice.

It should be understood that the electronic hanger system helps in identifying the clothing articles even at night as the user can utilize the illuminating device to emit light, which will allow the user to identify the clothing article.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electronic hanger system, comprising:
   a charging station including a plurality of arms attached to an elongated rod, the elongated rod has a base located at a distal end opposite to said plurality of arms;
   a hub attached to said elongated rod at a distal end proximal to the plurality of arms;
   one or more electrical contact points provided at each of the arms;
   a plurality of hangers placed at a closet rack, wherein each hanger comprises:
      hanger arms used for hanging at least one clothing article;
      a metal suspension hook coupled to the closet rack, a weight sensor located between said metal suspension hook and said hanger arms;
      an audio output device provided at the hanger arms; and
      an illuminating device provided at the hanger arms; and
   a user device configured to store information corresponding to said hub and additional clothing articles from said at least one clothing article hung from the plurality of hangers,
   wherein a user of user device uses the user device to select the at least one clothing article based on a style, type, and description of the at least one clothing article, wherein the user device transmits a request to the hub, wherein the user device communicates with the hub using a long-range communication protocol, said long-range communication protocol utilizes wireless connection technology, wherein the hub transmits the request to said each hanger from the plurality of hangers to produce sound by the audio output device or to illuminate the illuminating device such that the user's attention is drawn to said each hanger from the plurality of hangers holding the at least one clothing article, for each hanger to produce sound or to illuminate the illuminating device, the weight sensor sends an electric signal to a second processor embedded within said hanger arms to detect whether each hanger from the plurality of hangers has said at least one clothing article mounted thereon or not, the weight sensor also measures a weight of said at least one clothing article to use a weight parameter as an additional parameter for said user to select said at least one clothing article.

2. The electronic hanger system of claim 1, wherein user device includes one of a mobile phone, a tablet, a smart watch, a potable digital assistance device, and a computer.

3. The electronic hanger system of claim 1, wherein the each hanger comprises a cross member coupled to the hanger arms defining a triangular shaped hanger.

4. The electronic hanger system of claim 1, wherein the hanger includes a neck portion.

5. The electronic hanger system of claim 1, wherein the user device communicates with the hub using a long-range communication protocol, said long-range communication protocol utilizes wireless connection technology.

6. The electronic hanger system of claim 1, wherein the hub communicates with said each hanger using a short-range communication protocol.

7. The electronic hanger system of claim 1, wherein said each hanger includes a rechargeable battery.

8. The electronic hanger system of claim 7, wherein the metal suspension hook of the hanger is placed at the one or more electrical contact points to charge the rechargeable battery.

9. The electronic hanger system of claim 7, wherein the rechargeable battery is charged wirelessly.

* * * * *